Nov. 28, 1933.    R. J. WILSON    1,936,701
TWIN WHEEL CASTER
Filed June 21, 1932    2 Sheets-Sheet 1
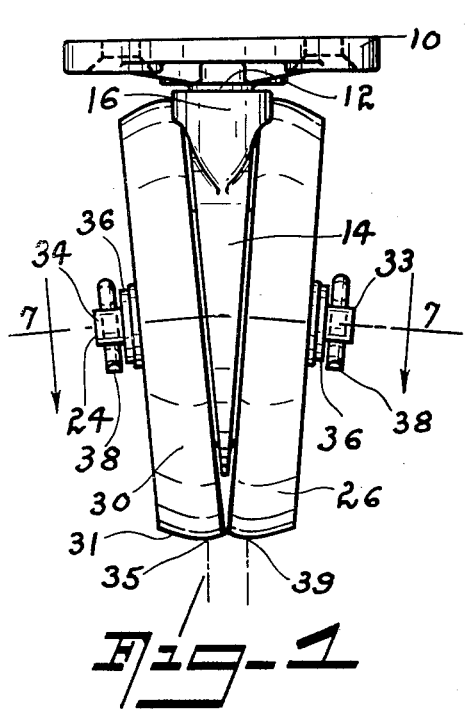
Fig-1
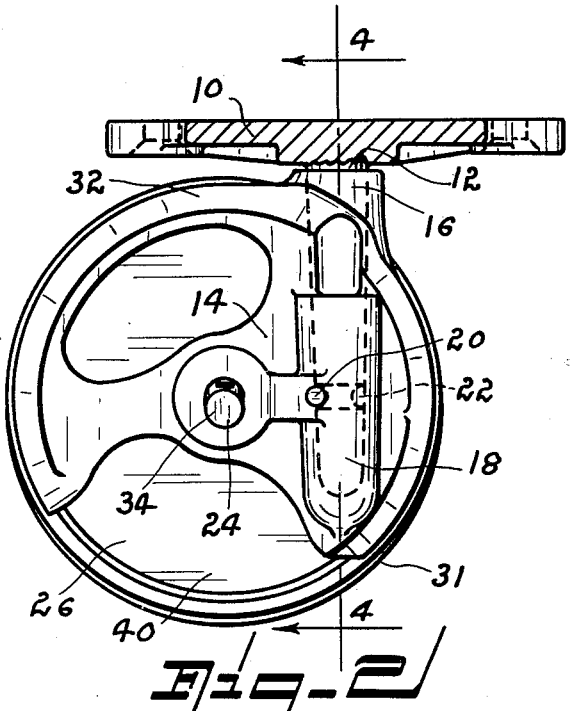
Fig-2
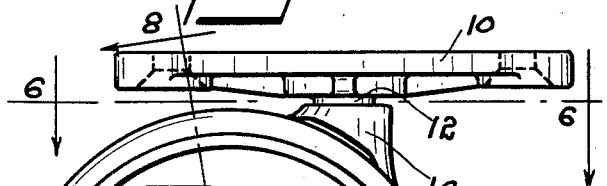
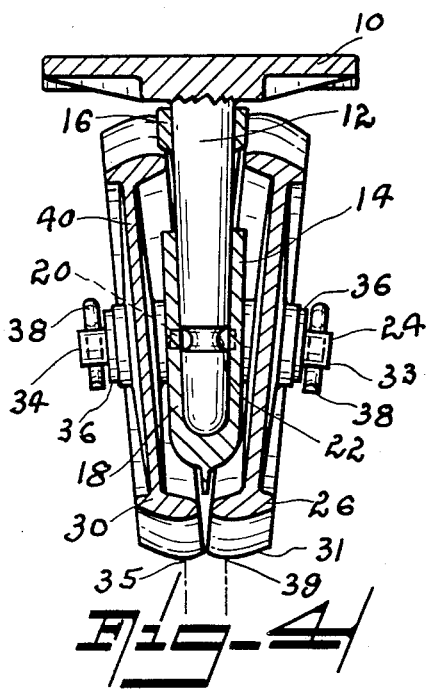
Fig-4
Fig-3
INVENTOR
Robert J. Wilson
BY
Smith & Tuck
ATTORNEYS Nov. 28, 1933.  R. J. WILSON  1,936,701
TWIN WHEEL CASTER
Filed June 21, 1932  2 Sheets-Sheet 2
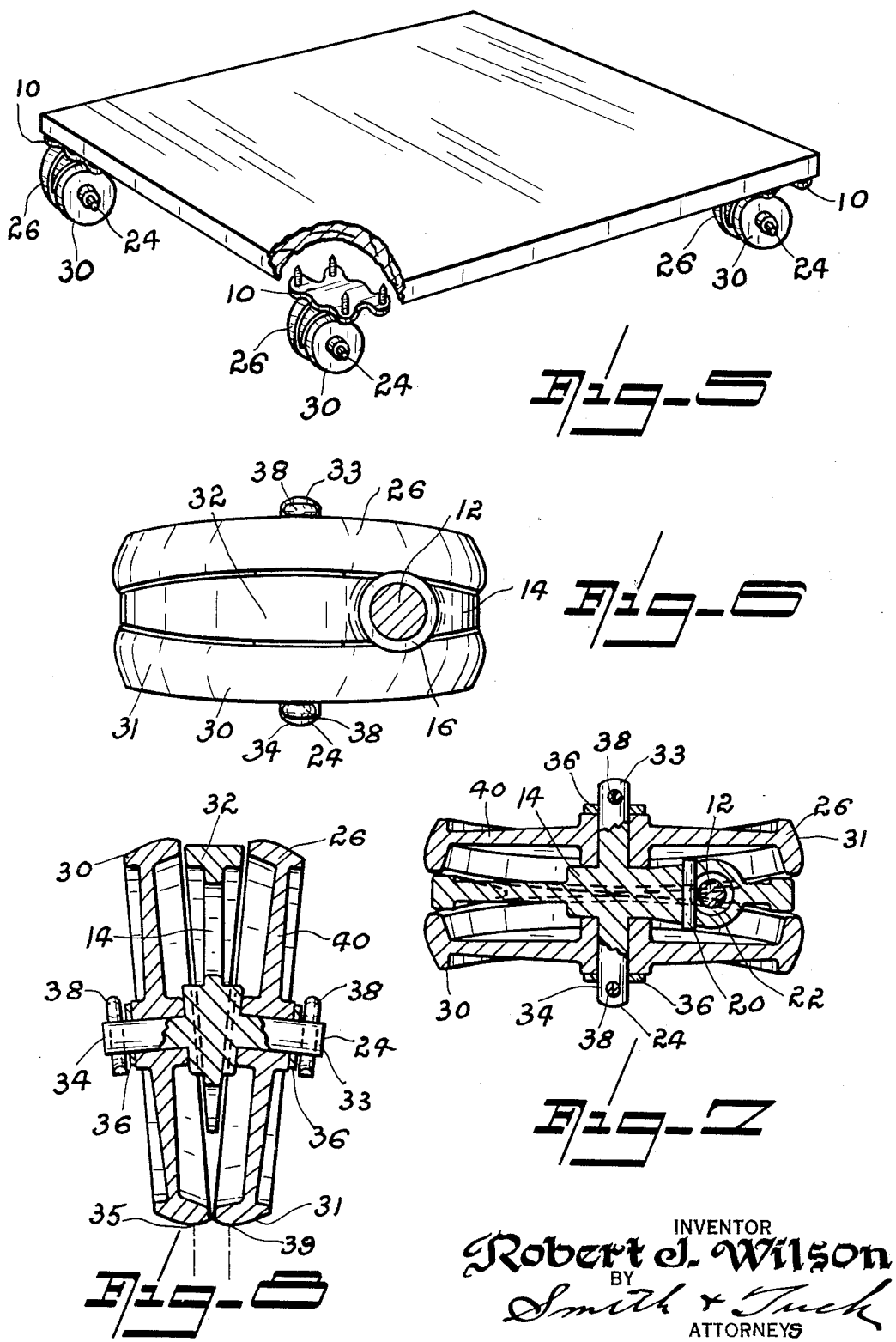
INVENTOR
Robert J. Wilson
BY
Smith & Tuck
ATTORNEYS Patented Nov. 28, 1933

1,936,701

UNITED STATES PATENT OFFICE 1,936,701

TWIN-WHEEL CASTER

Robert J. Wilson, Seattle, Wash.

Application June 21, 1932. Serial No. 618,545

4 Claims. (Cl. 16—47)

My present invention relates to the art of casters and more particularly to an improvement in a twin wheel caster.

Many forms of casters have been produced in the past, all with their particular features. In my present caster arrangement I provide two caster wheels which are so disposed as to abut one another at their lowermost point so that in effect the caster bears on about the same floor space as a single wider caster wheel.

Now it is well known that a single wheel caster is desirable over a two wheel caster of usual construction in that any obstructions which may be present will be ridden over whereas in the two wheel caster construction if the obstruction is in front of only one of the two wheels it tends to slue the caster around so that it tends to drag sideways and this results in increased friction, erratic movement of the supported device and often results in many breakages of the caster, scratched floors and the like. The objection of that type of caster, that is the single wheel caster, is that a yoke must be provided which extends around to each side of the hub. This makes it impossible to employ a large caster wheel, as could be employed in the two caster wheel arrangement. My present device makes it possible to employ caster wheels of the greatest possible diameter and at the same time equally support the load so that there are no unusual strains or stresses upon the casters themselves. A further advantage of my present construction resides in having the two caster wheels disposed at a slight angle to each other, that is the axle is bent downwardly from the center. This tends to force the caster wheel against the central body member and the side thrust is all taken at that point. This obviates one present deficiency of the usual casters in that they are given to wearing out the securing means disposed at the end of the axle. With my present construction, if the caster is not raised from the floor, it cannot come off its sloping axle. The principal objects of my present invention are:

First. The provision of a caster unit which tracks much as a single caster wheel will track.

Second. A caster construction which admits of having the greatest possible diameter in the caster wheels for a given overall height.

Third. The provision of a construction which provides a very simple swiveling arrangement.

Fourth. A caster arrangement which provides the maximum strength with the least amount of material.

Other and more specific objects will be apparent from the following description taken in connection with the accompanying drawings, wherein Figure 1 is a front elevation view of my device.

Figure 2 is a side elevation of my caster, the base of which is in section and showing one of the caster wheels removed to more clearly show the interior construction.

Figure 3 is a side elevation of my complete caster unit.

Figure 4 is a cross sectional view in elevation along the line 4—4 of Figure 2.

Figure 5 is a perspective view showing one manner in which my casters are used.

Figure 6 is top plan view of my caster taken along the line 6—6 of Figure 3 showing one portion only in section.

Figure 7 is a plan sectional view taken along the line 7—7 of Figure 1.

Figure 8 is a vertical sectional view taken along the line 8—8 of Figure 3.

Referring to the drawings, throughout which like reference characters indicate like parts, 10 designates the supporting frame or base of my caster. This may have any marginal outline but it is desirable that it be of minimum thickness; either secured to frame 10 or formed as an integral part thereof is the swivel pin 12. The long pin shown gives the maximum mechanical advantage against any overturning moment. This I prefer to arrange as slightly coned having its greatest diameter at the point where it joins base 10. Pivotally disposed on pin 12 is the axle supporting frame 14. This I prefer to form with a pin receiving cavity which is divided to form an upwardly extending boss 16 and the lower pin receiving socket 18 so as to permit both wheels to just clear the swivel pin 12. This I have found to be a desirable arrangement in that a reasonable amount of lubricant can be placed in this socket and no further lubricating need be applied for considerable period. About midway in this lower socket and disposed toward the lower end of pin 12, I provide a lock pin 20. This is disposed in a manner to go entirely thru the cast member 14 and is adapted to engage an annular groove 22 cut in pin 12. This forms a locking means which makes it impossible for the axle support member 14 to drop off the swivel pin.

Disposed at the center of frame 14 is the axle shaft 24. This may be formed preferably, as indicated in the drawings, as part of the casting 14. In some instances however it has been found desirable to form axle 24 as a separate piece and cast or otherwise secure it into casting 14. In any event it is desirable to have the two journals disposed at a small angle to each other so as to throw the wheels 26 and 30 at such an angle that they will meet at their lowermost point and be disposed sufficiently far apart at their upper end to just provide clearance for the swivel pin 12.

At each end of the axle or journal proper as 33 and 34, I provide a wheel securing means. The most convenient form I have yet devised, is to provide a retaining washer 36 and then a split or cotterpin 38. This forms an inexpensive and secure fastening when it is borne in mind particularly that no end thrust ordinarily is placed upon pin 38.

Wheels 26 and 30 are formed most preferably with a spoke or web support center 40 which is disposed outwardly from the center of the wheel rim to the end that more space will be available inside the caster wheels for the supporting pin 12 and frame 14. In the various views I have shown a type of construction which has generally been applied to a caster having a wheel diameter of about 6 inches. In this form it is possible to have sufficient material in frame 14 for the required strength without having the space inside the two wheels 26 and 30 entirely filled with metal. To this end I have shown the substantially skeletonized form which is most clearly shown, possibly in Figures 2 and 7. To the end of having the bearing point as close to the junction of the two wheels as possible I have found it desirable to round the outer edge of the wheel rims as indicated at 31, substantially as shown in Figures 1, 4 and 8. This puts the point of greatest load near the inner edge of the rim of the two supporting wheels. In the drawings this feature has been somewhat exaggerated to bring it out most clearly.

In Figure 3 I have illustrated by the section line 8—8, the line marking the closest point the two wheels come together at their lowermost part and where they are spaced the widest apart at their upper extent. The purpose of having the two wheels touch together in front of their actual bearing, which would be directly under the axle as indicated by the other dashed line of Figure 3, is to give the camber action noted in automobile front wheels particularly. This gives a tendency for the two wheels to crowd inwardly or to track together as it were. In addition to this very desirable result it also prevents the picking up of small particles between the two wheels.

In Figure 4 I have indicated the lowermost point of the two wheels at 35 and 39 respectively. This places the point of bearing somewhat inside of the central plane of the wheel. The amount that this is inside of the central plane bears a direct relationship to the angularity of the axles. The action of the two thrusts is in an opposite sense. In other words, if the bearing point 39 were in the exact center of the wheel rim there would be a straight upward thrust. However, having it inside of the wheel central plane a triangle of force is produced which provides an outward thrust component—that is in the direction of the end of the axle toward the securing pin. Now the action of the slanting axle is to cause the wheels to go up the axle and an ideal condition obtained where these two forces equalize each other. In this case there would be no apparent side thrust either inwardly or outwardly. The two side thrusts, one outwardly and one inwardly being of such an extent as to counterbalance each other. This is a very desirable characteristic and one which must be proportioned for each design produced. In my drawings I have indicated a relationship which has been found to produce this result in this particular design. When this condition is maintained there is little wear and it is felt that this is a very desirable characteristic of my present construction. Shock loads caused by striking obstructions can be minimized by having the two wheels meet as at on line 8—8, under this condition at point of contact there is a rolling action in which the two wheels neutralize the thrust by a rolling thrust contact thereby having in effect all the desirable qualities of a single wheel caster.

Web 32 has been used as a filling piece to fill in the space which would normally be void between the two wheels at their upper edges. This provides a higher degree of finish and also prevents large objects, gravel and the like, getting in between the two wheels at a point where they are well spaced apart and then locking as they drop to the lower portions where the wheels are quite close together. It should be quite apparent that the metal at the left of axle 24 as viewed in Figure 2 is normally not needed for strength. There are occasions however when it does serve a useful purpose. This condition arises when thru some unforeseen contingency the caster wheels are pulled sideways, this would place a heavy strain on the axles themselves were it not for rim 32. As disposed, however, rim 32 forms a support or stop which limits the inward movement of the wheels and often prevents serious damage either to the wheels themselves or to the journals 33 and 34.

It is desired to invite attention to the fact that socket 18 is disposed considerably to one side of axle 24. The amount of this displacement is determined by the degree of caster action desired. Attention is further invited to the fact that the wheels themselves, under the construction shown, can extend upwardly so they just clear base 10. This permits having wheels of the maximum diameter, for a given overall height, a very desirable characteristic of my construction.

The foregoing description and the accompanying drawings are believed to clearly disclose a preferred embodiment of my invention but it will be understood that this disclosure is merely illustrative and that such changes in the invention as may be made are fairly within the scope and spirit of the following claims.

Having thus fully described my invention, what I claim as new and desire to secure by Letters Patent is:—

1. The combination in a duplex caster with a base and a rigid swivel pin, of a wheel frame having a socket for said pin, laterally extending declining axles on said frame, and a pair of oppositely cambered wheels on said axles which engage each other in rolling contact at a point slightly in front of said axles.

2. In a duplex caster the combination with a pair of oppositely cambered wheels, the rims of the wheels having lateral contact with each other in front of their lowermost points, said rims having transversely rounded treads, and the maximum peripheries of the treads being located adjacent the lateral contact points.

3. The combination with a base plate and rigid tapering swivel pin, of an arcuate shaped wheel frame having a socket for said pin and means for securing the pin in the socket, a bearing boss rigid with the frame and spaced from the socket, a pair of laterally extending declining axles on the frame, and a pair of cambered wheels journaled on said axles which engage each other in rolling contact at a point slightly in front of said axles.

4. In a duplex caster the combination with a wheel supporting frame; a pair of oppositely cambered wheels, the rims of said wheels having lateral contact with each other in front of their lowermost point, said rims having transversely rounded treads, the maximum periphery of the tread being located inwardly from the center line of the wheels; and a wedge shaped filling piece, secured to said frame, disposed to substantially fill the space between the wheel rims and to provide lateral support for said wheels.

ROBERT J. WILSON.